United States Patent
Zhuang et al.

(10) Patent No.: US 11,218,523 B2
(45) Date of Patent: Jan. 4, 2022

(54) METHOD OF PROVIDING INFORMATION TO AN AUDIO/VIDEO RECEIVER DEVICE AND CORRESPONDING APPARATUS

(71) Applicant: InterDigital CE Patent Holdings, SAS, Paris (FR)

(72) Inventors: Zujian Zhuang, Beijing (CN); Jiancheng Liu, Beijing (CN)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 178 days.

(21) Appl. No.: 16/616,476

(22) PCT Filed: May 24, 2017

(86) PCT No.: PCT/CN2017/085697
§ 371 (c)(1),
(2) Date: Nov. 24, 2019

(87) PCT Pub. No.: WO2018/214051
PCT Pub. Date: Nov. 29, 2018

(65) Prior Publication Data
US 2020/0213369 A1 Jul. 2, 2020

(51) Int. Cl.
*H04L 29/06* (2006.01)
*H04L 12/18* (2006.01)
*H04L 12/761* (2013.01)

(52) U.S. Cl.
CPC ........ *H04L 65/4076* (2013.01); *H04L 12/185* (2013.01); *H04L 12/1877* (2013.01);
(Continued)

(58) Field of Classification Search
CPC . H04L 65/4076; H04L 65/607; H04L 65/608; H04L 12/18; H04L 12/185; H04L 12/1877; H04L 45/16
(Continued)

(56) References Cited

U.S. PATENT DOCUMENTS

| 7,974,192 | B2 | 7/2011 | Ding |
| 11,019,372 | B2 * | 5/2021 | Van Zijst .......... H04L 29/12028 |

(Continued)

FOREIGN PATENT DOCUMENTS

| CN | 101098423 A | 1/2008 |
| CN | 102474426 A | 5/2012 |

(Continued)

OTHER PUBLICATIONS

Cain et al., "Internet Group Management Protocol, Version 3", Internet Society, Network Working Group, Request for Comments 3376, Standards Track, Oct. 2002, 53 pages.

(Continued)

*Primary Examiner* — Rownak Islam
(74) *Attorney, Agent, or Firm* — Volpe Koenig

(57) ABSTRACT

To enable fast startup of an audio/video receiver device and quick receipt of a first audio/video stream, is provided a method in an intermediate device in between a router device and the receiver device. The intermediate device snoops the communication between the audio/video receiver device and the router device to determine the protocol version of the router device to subscribe to a transmission of an audio/video stream and to determine that the receiver device is starting up. If the protocol version is a version not supporting Source Specific Multicast and the receiver device is booting, a message indicating the protocol version is transmitted to the receiver device during starting up of the receiver device so that the latter can switch to a protocol version supported by the IP multicast router device without further delay.

18 Claims, 8 Drawing Sheets

(52) U.S. Cl.
CPC ............ *H04L 45/16* (2013.01); *H04L 65/607* (2013.01); *H04L 65/608* (2013.01); *H04L 12/18* (2013.01)

(58) Field of Classification Search
USPC ........................................................ 370/390
See application file for complete search history.

(56) References Cited

U.S. PATENT DOCUMENTS

| | | |
|---|---|---|
| 2006/0146823 A1 | 7/2006 | Ding |
| 2007/0106806 A1 | 5/2007 | Tu et al. |
| 2008/0250146 A1 | 10/2008 | Arwe et al. |
| 2009/0222871 A1 | 9/2009 | Schaefer et al. |
| 2010/0330726 A1 | 12/2010 | Gonsiorawski et al. |
| 2013/0182707 A1 | 7/2013 | Angst et al. |

FOREIGN PATENT DOCUMENTS

| | | |
|---|---|---|
| CN | 103905841 A | 7/2014 |
| CN | 104104606 A | 10/2014 |
| EP | 1983713 A1 | 10/2008 |
| KR | 100823544 B1 | 4/2008 |

OTHER PUBLICATIONS

Christensen et al., IGMP and MLD snooping switches, IDMR Working Group, Internet Draft (Jun. 2001).

\* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type = 0x11   | Max Resp Code |           Checksum            |
+-+-+-+-+-+-+-+-+-+-+-+-+-+-+-+-+-+-+-+-+-+-+-+-+-+-+-+-+-+-+-+-+
|                         Group Address                         |
+-+-+-+-+-+-+-+-+-+-+-+-+-+-+-+-+-+-+-+-+-+-+-+-+-+-+-+-+-+-+-+-+
| Resv  |S| QRV |     QQIC      |     Number of Sources (N)     |
+-+-+-+-+-+-+-+-+-+-+-+-+-+-+-+-+-+-+-+-+-+-+-+-+-+-+-+-+-+-+-+-+
|                       Source Address [1]                      |
+-                                                             -+
|                       Source Address [2]                      |
+-                              .                              -+
.                               .                               .
.                               .                               .
+-                                                             -+
|                       Source Address [N]                      |
+-+-+-+-+-+-+-+-+-+-+-+-+-+-+-+-+-+-+-+-+-+-+-+-+-+-+-+-+-+-+-+-+
```

Fig. 1

METHOD OF PROVIDING INFORMATION TO AN AUDIO/VIDEO RECEIVER DEVICE AND CORRESPONDING APPARATUS

This application claims the benefit, under 35 U.S.C. § 365 of International Application PCT/CN2017/085697, filed May 24, 2017, which was published in accordance with PCT Article 21(2) on Nov. 29, 2018, in English.

FIELD

The present disclosure generally relates to the field of compatibility between protocol versions used by a router device and an audio/video receiver device configured to receive audio/video streams from the router device.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

The Internet Group Management Protocol (IGMP) is a communication protocol that is part of Internet Protocol (IP) multicast. IP multicast is a method of sending IP datagrams to a group of interested receivers in a single transmission. It is a form of point-to-multipoint communication often employed for streaming media applications such as online streaming video and gaming on the Internet and private networks. IGMP operates between an IP multicast receiver device and a local IP multicast router. To receive an IP multicast stream, the IP multicast receiver device requests membership to an IP multicast group for the IP multicast stream through its local IP multicast router while the local IP multicast router listens for these requests and periodically sends out subscription queries. There exist multiple versions of IGMP. IGMP version 2 (IGMPv2) improves over IGMP version 1 (IGMPv1) by adding the ability for an IP multicast receiver device to signal desire to leave a multicast group (IGMP 'leave'). IGMP version 3 (IGMPv3) improves over IGMP version 2 mainly by supporting source-specific multicast (SSM). Source-specific multicast is a method of delivering IP multicast packets in which the only packets that are delivered to an IP multicast receiver device are those originating from a specific source address requested by the IP multicast receiver device. By so limiting the source, SSM reduces demands on the network and improves security.

While currently sold IP multicast receiver devices comply with IGMPv3, there are still many IP multicast routers functioning in IGMPv2 mode. An IP multicast receiver device, e.g., an IP Set Top Box (IPSTB) for receiving digital television over IP or an IP digital television (IPDTV), starting up in IGMPv3 mode, will not be able to request and receive IP multicast streams from an IGMPv2 IP multicast router until it is aware that the IP multicast router is using IGMPv2. This considerably slows down the reception of a first IP multicast stream upon startup of the IGMPv3 IP multicast receiver device. Upgrading of the IGMPv2 IP multicast router to IGMPv3 is not always possible. Replacement is costly.

There is thus a need for a solution to improve slow IP multicast receiver device startup due to incompatibility between IGMP versions of the IP multicast receiver device and an IP multicast router, that does not require an upgrade of the IP multicast router equipment to the latest IGMP version nor replacement of the equipment.

SUMMARY

According to one aspect of the present disclosure, there is disclosed a method of providing information to an audio/video stream receiver device. The method is implemented by an intermediate device interconnecting an audio/video stream router device and the audio/video stream receiver device. The method comprises receiving, from the audio/video stream router device, a first message and obtaining from the first message a protocol version to use for the audio/video stream receiver device to subscribe to a transmission by the audio/video stream router device of an audio/video stream. The method further comprises receiving, from the audio/video receiver device, a second message indicative of the audio/video receiver device starting up and transmitting, to the audio/video stream receiver device, a third message indicative of the audio/video stream router device using a protocol version not supporting source-specific multicast if the protocol version is a protocol version not supporting source-specific multicast.

According to a further aspect of the method of providing information to an audio/video stream receiver device, the protocol is an Internet Group Management Protocol. The protocol version is an Internet Group Management Protocol, the audio/video stream is an Internet Protocol multicast audio/video stream and the first message and the third message are Internet Group Management Protocol General Query messages.

According to a further aspect of the method of providing information to an audio/video stream receiver device, the second message is a Dynamic Host Configuration Protocol Discover message.

According to a further aspect of the method of providing information to an audio/video stream receiver device, the method further comprises obtaining the Internet Group Management Protocol version of the first message from a length of the first message.

According to a further aspect of the method of providing information to an audio/video stream receiver device, the method further comprises obtaining the Internet Group Management Protocol version of the received Internet Group Management Protocol General Query message from a Host Compatibility Mode variable of the audio/video stream router device.

According to a further aspect of the method of providing information to an audio/video stream receiver device, the method further comprises applying an additional condition to the transmitting of the third message to the audio/video stream device of checking from the second message if the audio/video stream receiver device from which the second message is received corresponds to a device for which the transmitting of the third message is enabled.

According to a further aspect of the method of providing information to an audio/video stream receiver device, the method further comprises applying an additional condition to the transmitting of the third message to the audio/video stream receiver device of checking from the second message if a Media Access Control address of the audio/video stream receiver device corresponds to a device for which the transmitting of the third message is enabled.

According to a further aspect of the method of providing information to an audio/video stream receiver device, the method further comprises an additional condition to the transmitting of the third message to the audio/video stream receiver device of checking whether a Dynamic Host Configuration Protocol acknowledge message has been received that is destined to the audio/video stream receiver device.

The present principles also relate to a device for providing information to an audio/video stream receiver device. The device for providing information to an audio/video stream receiver device comprises a processor and a memory. The processor and the memory are configured to receive, from an audio/video stream router device, a first message and obtain from the first message a protocol version to use for the audio/video stream receiver device to subscribe to a transmission by the audio/video stream router device of an audio/video stream. The processor and the memory are further configured to receive, from the audio/video receiver device, a second message indicative of the audio/video receiver device starting up and if the protocol version is a protocol version not supporting source-specific multicast, to transmit, to the audio/video stream receiver device, a third message indicative of the audio/video stream router device using a protocol version not supporting source-specific multicast.

According to a further aspect of the device for providing information to an audio/video stream receiver device, the protocol is an Internet Group Management Protocol, the protocol version is an Internet Group Management Protocol, the audio/video stream is an Internet Protocol multicast audio/video stream and the first message and the third message are Internet Group Management Protocol General Query messages.

According to a further aspect of the device for providing information to an audio/video stream receiver device, the second message is a Dynamic Host Configuration Protocol Discover message.

According to a further aspect of the device for providing information to an audio/video stream receiver device, the processor and the memory are further configured to obtain the Internet Group Management Protocol version of the first message from a length of the first message.

According to a further aspect of the device for providing information to an audio/video stream receiver device, the processor and the memory are further configured to obtain the Internet Group Management Protocol version of the Internet Group Management Protocol General Query message from a Host Compatibility Mode variable of the audio/video stream router device.

According to a further aspect of the device for providing information to an audio/video stream receiver device, the processor and the memory are further configured to apply an additional condition to the transmitting of the third message to the audio/video stream receiver device of checking from the second message if the audio/video stream receiver device from which the second message is received corresponds to a device for which the transmitting of the third message is enabled.

According to a further aspect of the device for providing information to an audio/video stream receiver device, the processor and the memory are further configured to apply an additional condition to transmitting of the third message to the audio/video stream receiver device of checking from the second message if a Media Access Control address of the audio/video stream receiver device corresponds to a device for which the transmitting of the third message is enabled.

According to a further aspect of the device for providing information to an audio/video stream receiver device, the processor and the memory are further configured to apply an additional condition to the transmitting of the third message to the audio/video stream receiver device of checking whether a Dynamic Host Configuration Protocol acknowledge message has been received that is destined to the audio/video stream receiver device.

BRIEF DESCRIPTION OF THE DRAWINGS

More advantages of the present disclosure will appear through the description of particular, non-restricting embodiments. In order to describe the manner in which the advantages of the present disclosure can be obtained, particular descriptions of the present principles are rendered by reference to specific embodiments thereof which are illustrated in the appended drawings. The drawings depict exemplary embodiments of the disclosure and are therefore not to be considered as limiting its scope. The embodiments described can be combined to form particular advantageous embodiments. In the following figures, items with same reference numbers as items already described in a previous figure will not be described again to avoid unnecessary obscuring the disclosure. The embodiments will be described with reference to the following drawings in which:

FIG. 1 is a message header of an example message for requesting if devices are interested in receipt of a multicast audio/video stream.

Figure 2:
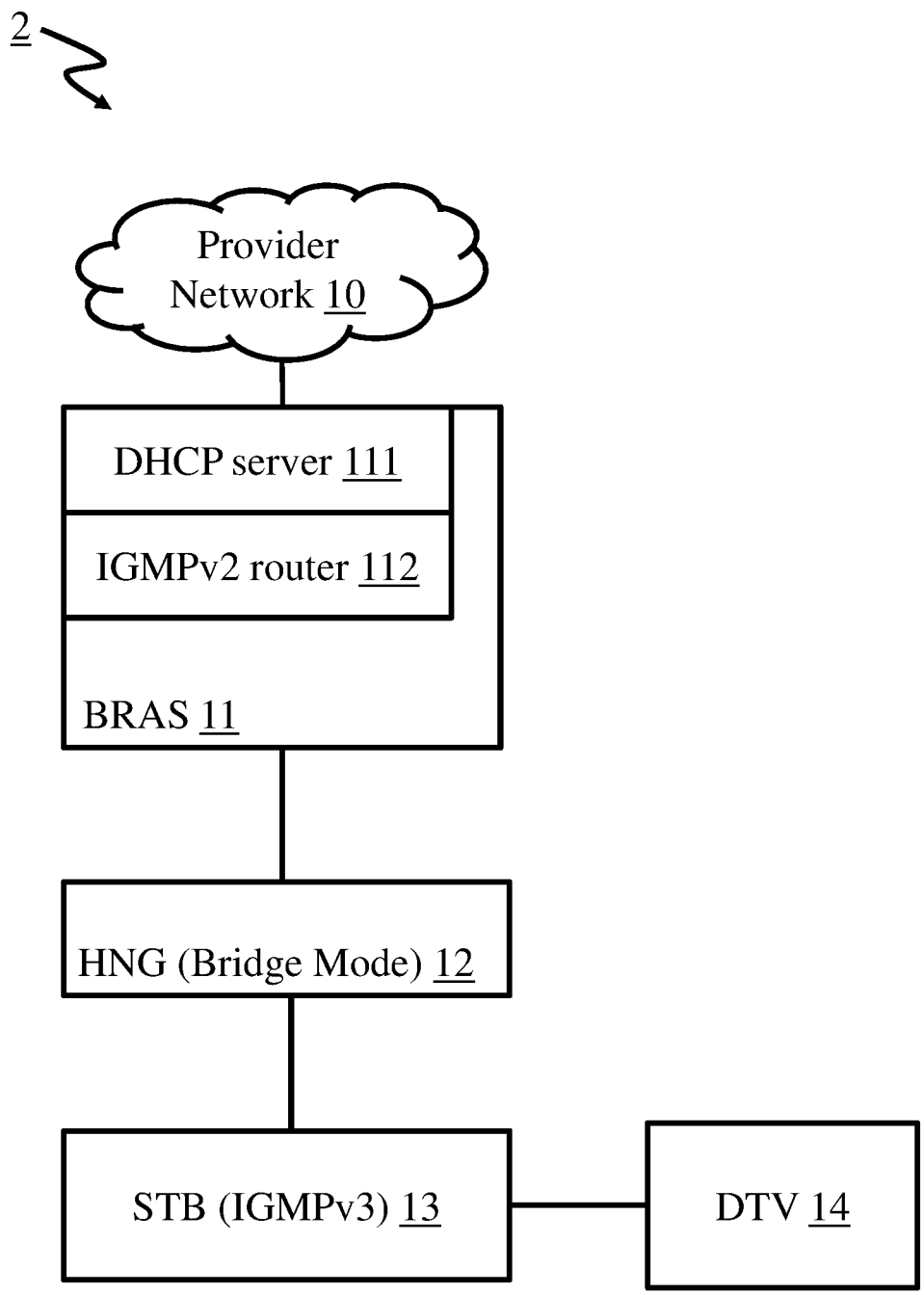
FIG. 2 is a system 2 for transmission and reception of audio/video streams.

It should be understood that the drawings are for purposes of illustrating the concepts of the disclosure and are not necessarily the only possible configuration for illustrating the disclosure.

DETAILED DESCRIPTION

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As discussed in the background section, an IP multicast receiver device, starting up in IGMPv3 mode, will not be able to request reception of IP multicast streams from an IGMPv2 IP multicast router until it is aware that the IP multicast router is using IGMPv2 and it can revert to IGMPv2. This considerably slows down the reception of a first IP multicast stream upon startup of the IGMPv3 IP multicast receiver device. This is because any IGMPv3 IGMP join requests from the IGMPv3 IP multicast receiver device will be discarded by the IGMPv2 IP multicast router. IGMPv3 comprises a backwards compatibility feature which specifies that if an IP multicast receiver device receives an IGMPv1 or IGMPv2 General Query message, the IP multicast receiver device is required to revert to the older, IGMPv1 or IGMPv2 mode of operation. IGMP General Query messages are transmitted by an IP multicast router every 125 seconds. It may thus take up to more than 125 seconds from startup of an IGMPv3 IP multicast receiver device to set up reception of a first IP multicast stream from an IGMPv2 IP multicast router.

FIG. 1 is a message header of an example message for requesting if devices are interested in receipt of a multicast audio/video stream. In particular is depicted in FIG. 1 an IGMP message header of an IGMP Membership Query Message. To be compatible with older version routers, the IGMPv3 specification requires that an IGMPv3 host operates in v1 and v2 compatibility modes. IGMPv3 hosts must keep state per local interface regarding the compatibility mode of each attached network. A host's compatibility mode is determined from the Host Compatibility Mode (HCM) variable which can be in one of three states: IGMPv1, IGMPv2 or IGMPv3. This variable is kept per interface and is notably dependent on the version of General Queries heard on that interface. There are three types of Membership Query Messages. A Membership Query Message has a Type field set to 0x11. The previously discussed General Query message is one of the possible Membership Query Messages. An IGMP General Query is a Membership Query Message of which both the Group Address field and the Number of Sources (N) field are zero. The IGMP version of a General Query Message can be determined as follows:

IGMPv1: length 8 octets and Max Resp Code field is zero.
IGMPv2: length 8 octets and Max Resp Code field is non-zero.
IGMPv3: length>=12 octets.

FIG. 2 is a system 2 for transmission and reception of audio/video streams. In particular, system 2 is suitable for transmission and reception of IP multicast streams including transmission and reception of audiovisual data such as audio/video streams. System 2 includes a digital television DTV 14, a Set Top Box STB 13, a Home Network Gateway 12, a Broadband Remote Access Server BRAS 11 and a Provider Network 10. DTV 14 is connected to STB 13 via a High Definition Multimedia Interface (HDMI). STB 13 is connected to HNG 12 via an Ethernet link in what is commonly referred to as a Local Area Network (LAN). HNG 12 is connected to BRAS 11 via a Digital Subscriber Link (DSL) or a Data Over Cable Service Interface Specification (DOCSIS) or a Passive Optical Network (PON) and via subsequent network equipment not shown. BRAS 11 is connected to Provider Network 10 via a high bandwidth communication link. BRAS 11 includes a DHCP server and an IGMPv2 IP multicast router, while STB 13 is an IGMPv3 IP multicast receiver. HNG 12 is functioning in bridge mode (Open Systems Interconnection model (OSI) layer 2) for DHCP and IGMP traffic. That is, HNG 12 is not taking an active part in DHCP and IGMP communication between STB 13 and BRAS 11; STB 13 can subscribe to reception of an IP multicast stream transmitted by BRAS 11 through transmission of an IGMP join message. If BRAS 11 receives such a message, it can transmit the requested IP multicast stream to STB 13. STB 13 then decodes the information included in the received IP multicast stream and transmits the decoded stream DTV 14, which renders the audiovisual information included in the multicast stream as moving images and sound.

Figure 3:
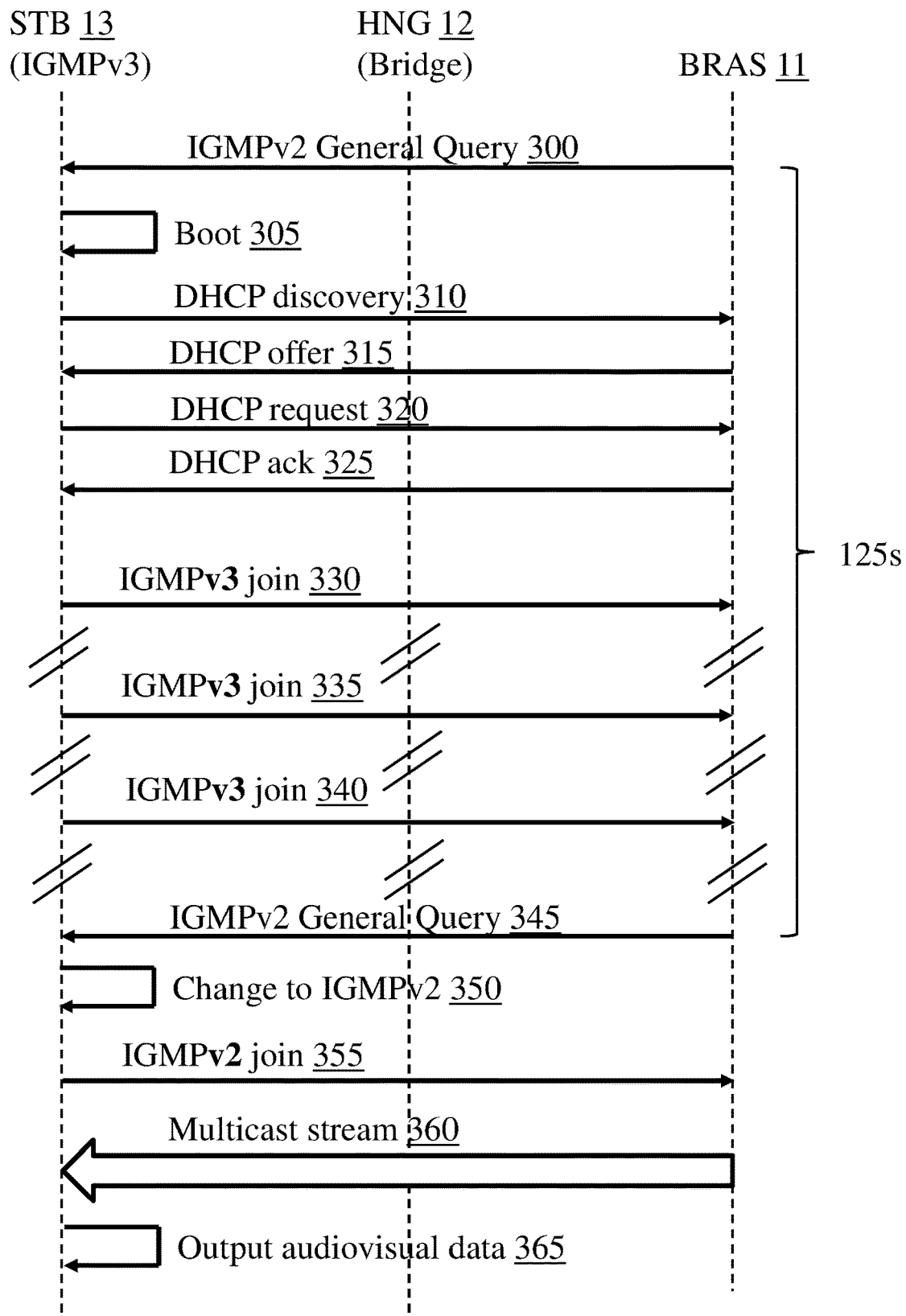
FIG. 3 is a flow chart of data communication messages exchanged between the devices of the system 2 of FIG. 2.

FIG. 3 is a flow chart of data communication messages exchanged between the devices of system 2 as depicted in FIG. 2. From left to right are shown, audio/video stream receiver device STB 13, intermediate device HNG 12, and BRAS 11 including a router 112. As aforementioned, HNG 12 functions in bridge mode and does therefore not take active part in the communication between STB 13 and BRAS 11, apart from doing NAT. STB 13 uses a first protocol version to subscribe to a transmission by the audio/video stream router device of an audio/video stream (e.g., IGMPv3 mode), while the IP multicast router in BRAS 11 uses a second protocol version (e.g., n IGMPv2). The flow chart starts with the IGMPv2 IP multicast router 112 in BRAS 11 transmitting an IGMPv2 General Query 300. As aforementioned, such messages are transmitted every 125 s. As it happens, the IGMPv2 General Query message is transmitted to STB 13 while it is switched off. The message is therefore not received by STB 13. When STB 13 boots (starts up) 305, STB 13 is functioning in IGMPv3 mode. At startup, STB 13 requests an IP address from the DHCP server in BRAS 11. This results some exchanges between STB 13 and BRAS 11 according to the DHCP protocol (310-325). STB is finally attributed an IP address. Then, STB 13 wishes to subscribe to an IP multicast stream and therefore sends 330 an IGMPv3 join message to BRAS 11. However, since the IP multicast router in BRAS 11 is functioning in IGMPv2 mode, the IGMPv3 join message is discarded. STB 13 repeatedly (335, 340) sends IGMPv3 join messages to BRAS 11 in the hope of a reply. These messages are discarded by BRAS 11. One hundred twenty-five seconds after having sent IGMPv2 General Query message 300, BRAS 11 repeats 345 the transmission of the IGMPv2 General Query message. This time, the message is received by STB 13, and STB 13 switches to IGMPv2 mode of operation. Following this, it repeats the transmission of the IGMP join message, but this time in IGMPv2 format. This time, the message is considered by the IP multicast router in BRAS 11, and the requested IP multicast stream is transmitted 360 to STB 13. The stream is received and decoded by STB 13, which outputs 365 audiovisual data on its HDMI interface, and the audiovisual data is rendered by DTV 14. It can thus be observed that 125 seconds are lost, spent in waiting for the next transmission of the IGMP General Query message. During this waiting time (startup time, startup- or boot-delay), no audiovisual stream is received by STB 13, and no audiovisual data is rendered by DTV 14. The above is a worst-case scenario. In practice, because there is no synchronization between the transmittal by BRAS 11 of General Query messages and startup of STB 13, the General Query message may be received after startup of STB 13, in which case STB 13 will be able to switch to IGMPv2 earlier, resulting in a delay that is shorter than 125 seconds. In general, it can thus be said that a random wait time of maximum 125 seconds before being able to show a picture on DTV 14 can be expected with the prior-art system 2 of FIG. 2.

Figure 4:
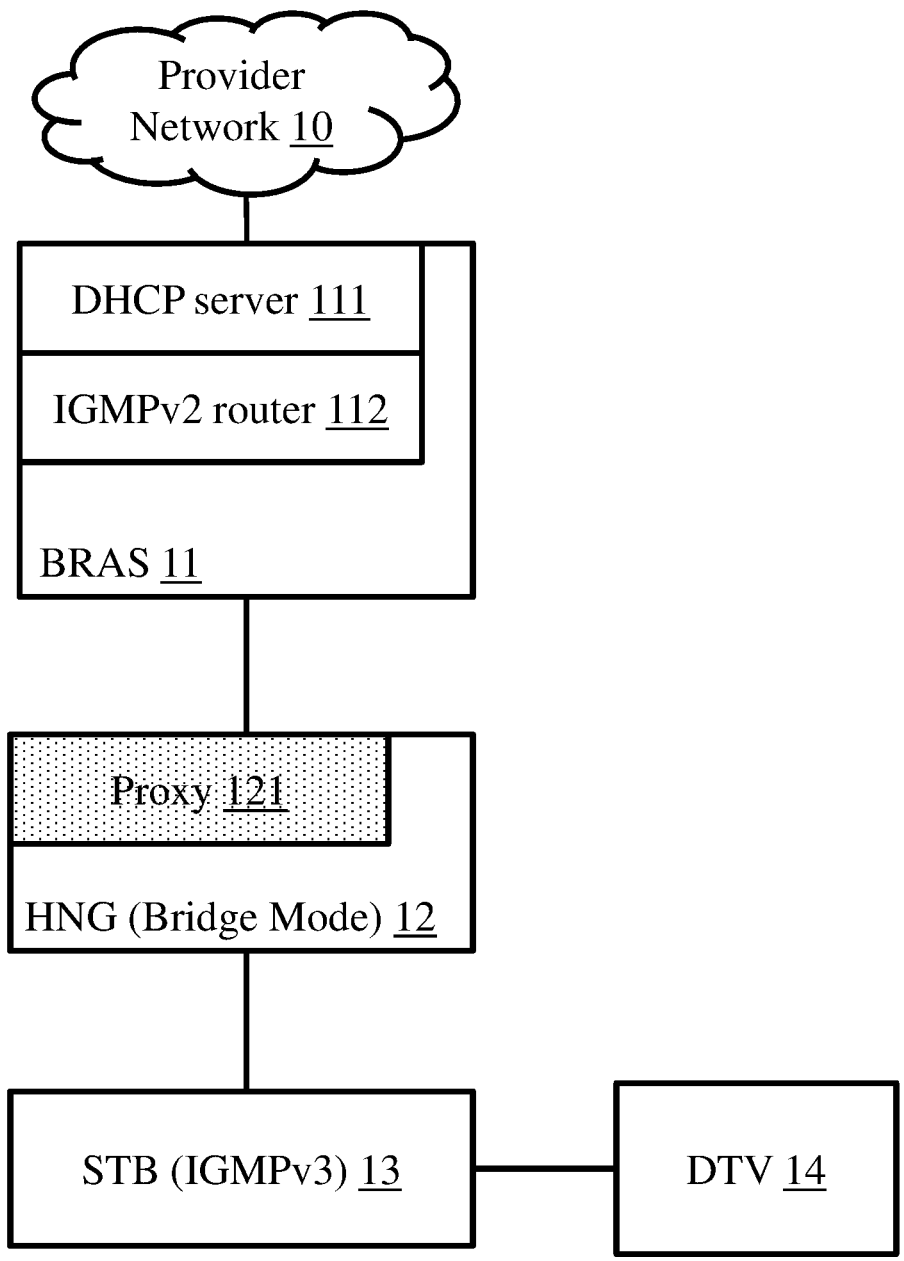
FIG. 4 is an embodiment of a system 4 per the principles of the present disclosure.
Figure 8:
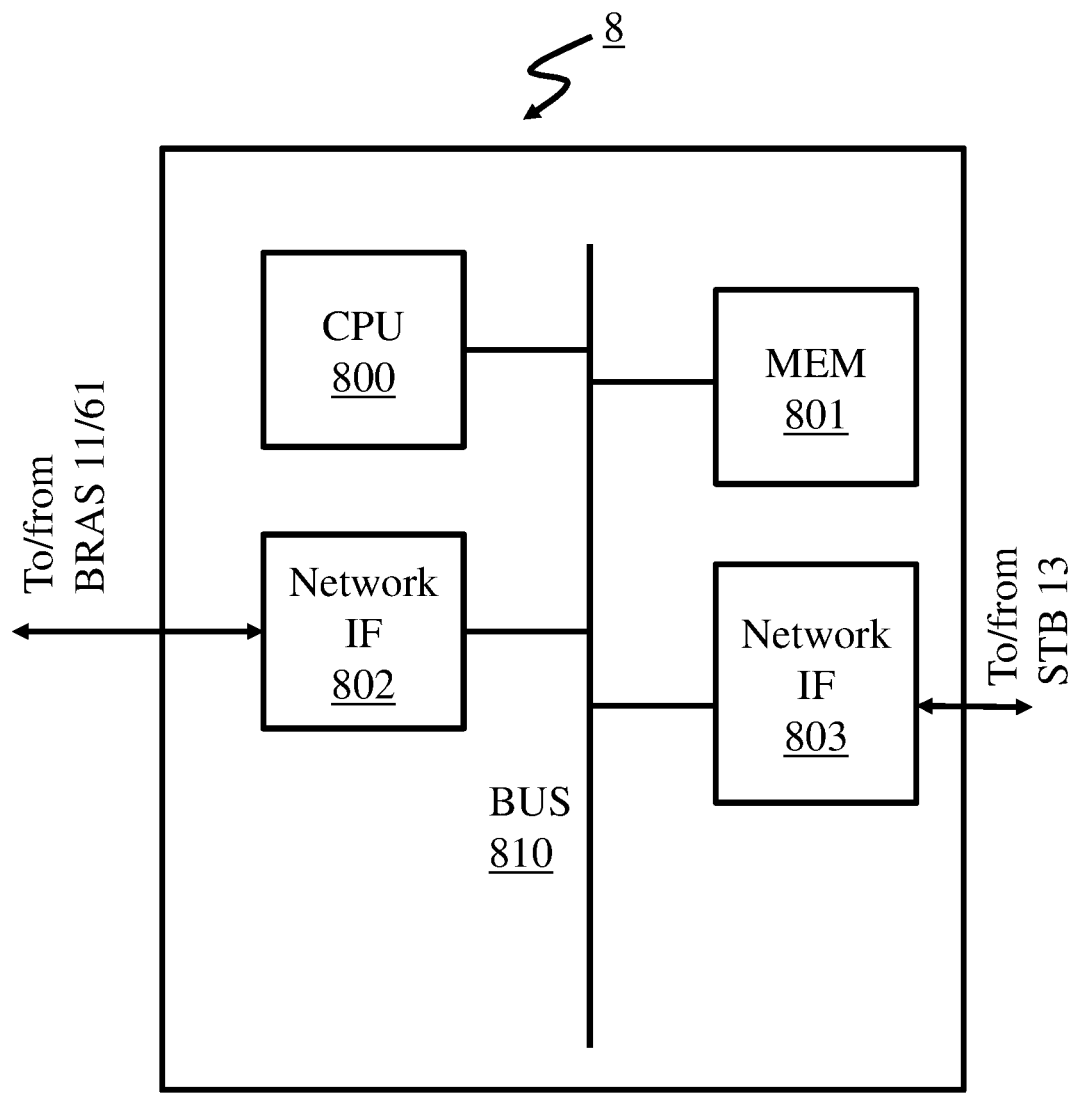
FIG. 8 is an embodiment of a device 8 for implementing the method of per the principles of the present disclosure.

FIG. 4 is an embodiment of a system 4 per the principles of the present disclosure. HNG 12 includes a proxy device 121, of which the functioning is explained with the aid of FIG. 5. HNG 12 may include local memory for storing code and for storing data, one or more processors for executing the code and for reading and writing data to the local memory. HNG 12 may further include wired or wireless network interfaces, e.g. one wired network interface for connecting to via external network to BRAS 11 and two network interfaces e.g., wired Ethernet and wireless WiFi for connecting to a local network that includes STB 13. An example hardware for a HNG according to the present principles is depicted in FIG. 8.

Figure 5:
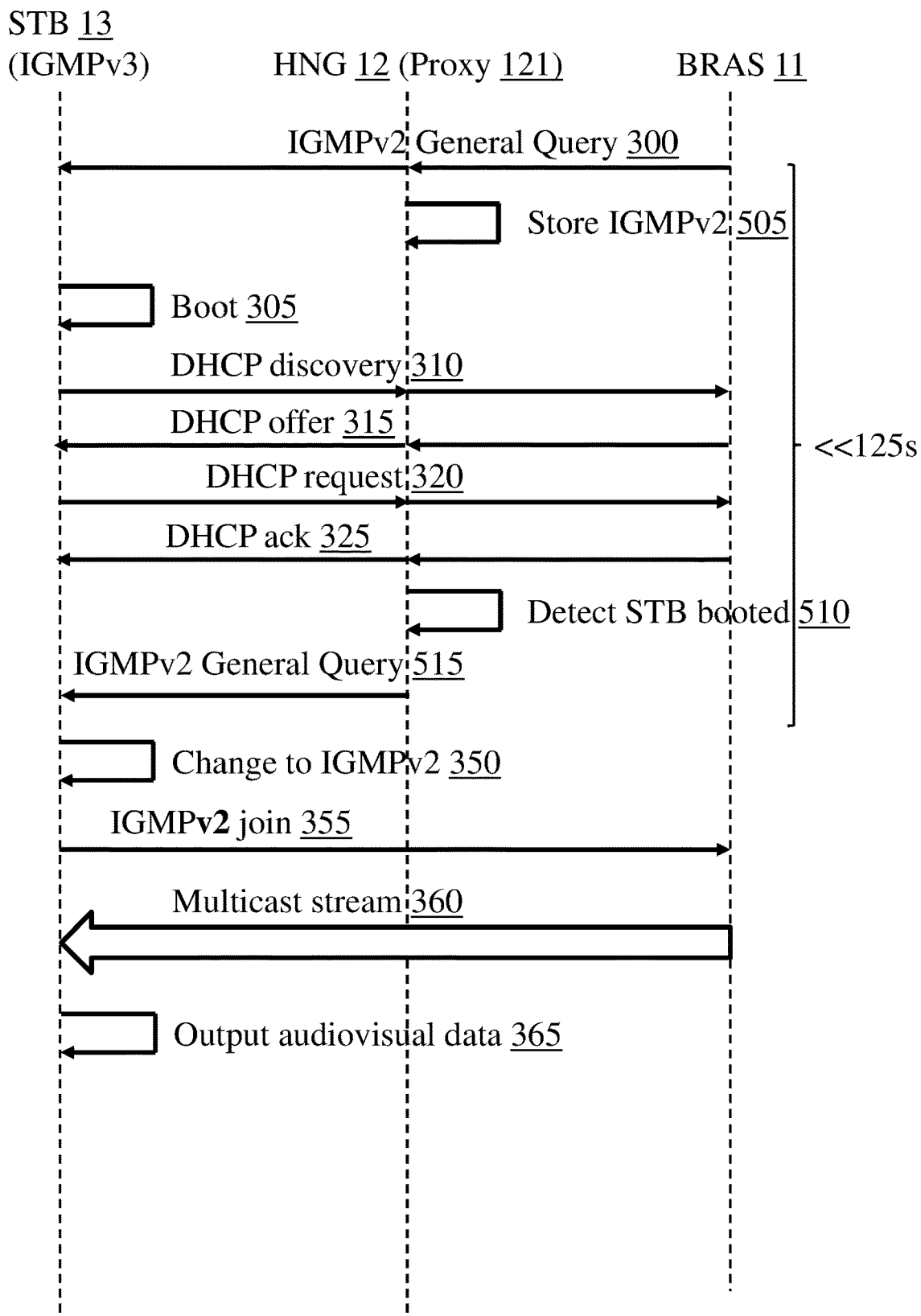
FIG. 5 is a flow chart of data communication messages exchanged between the devices of system 4 depicted in FIG. 4.

FIG. 5 is a flow chart of example data communication messages exchanged between the devices of system 4 as depicted in FIG. 4. From left to right are shown: STB 13, proxy 121 in HNG 12, and BRAS 11. As aforementioned, HNG 12 functions in bridge mode and does therefore not take active part in the communication between STB 13 and BRAS 11, apart from doing NAT. HNG 12 is an intermediate device between the external (Wide Area Network, WAN) network and the local network (LAN). Per the principles of the present disclosure, the intermediate device (e.g., HNG 12 by means of proxy 121), snoops (listens, monitors, receives) the data communication between an audio/video stream router device (e.g., BRAS 11) in the WAN and an audio/video stream receiver device (e.g., STB 13) in the LAN. For example, intermediate device HNG 12 listens to DHCP and IGMP packets exchanged between the WAN and the LAN and obtains a protocol version to use for the audio/video stream receiver device to subscribe to a transmission by the audio/video stream receiver device of an audio/video stream. For example, STB 13 in the LAN is functioning in IGMPv3 mode of operation, while the IP multicast router device in the WAN BRAS 11 is functioning in IGMPv2 mode of operation. The flow chart begins with the IGMPv2 IP multicast router 112 in BRAS 11 transmitting an IGMPv2 General Query 300. As aforementioned, such messages 300 are transmitted every 125 s. As it happens, the IGMPv2 General Query message 300 is transmitted to STB 13 while it is switched off. The message is therefore not received by STB 13. However, and per the principles of the present disclosure, the proxy's IGMP snooper function receives the IGMP General Query to STB 13 and obtains (reads) information relating to the IGMP operating version (protocol version) of the IP multicast router 112 in BRAS 11 from message 300. When STB 13 boots (starts up) 305, STB 13 thus functions in IGMPv3 mode. At startup, STB 13 requests an IP address from the DHCP server 111 in BRAS 11, e.g., a DHCP Discover message, which is an example of a message indicative of the audio/video stream receiver device starting up. This results some exchanges between STB 13 and BRAS 11 according to the DHCP protocol (310-325). STB 13 is finally attributed an IP address. Per the principles of the present disclosure and as aforementioned, intermediate device HNG 12 by means of proxy 121 snoops the DHCP exchanges between the DHCP server 111 in BRAS 11 and STB 13; HNG 12 by means of proxy 121 thus receives the DHCP messages transmitted by STB 13 to DHCP server 111 and is thus aware of the fact that STB 13 is in a booting process (is starting up, is in a startup process); it therefore detects 510 that STB 13 is booting or has booted. Accordingly, and based on the obtained information relating to the IGMP operating version of the IP multicast router 112 (protocol version) in BRAS 11, it transmits (injects) a message indicative of the audio/video stream router device (BRAS 11) using a protocol version that does not support source-specific multicast into the LAN, e.g., an IGMPv2 General Query message 515. STB 13 receives this message and switches 350 to IGMPv2 mode of operation. Then, STB 13 wishes to subscribe to an IP multicast stream and therefore sends 355 an IGMPv2 join message to the IP multicast router in BRAS 11. Since the IP multicast router in BRAS 11 is also functioning in IGMPv2 mode, the IGMPv2 join message is not discarded. The message is considered by the IP multicast router in BRAS 11, and the requested IP multicast stream is transmitted 360 to STB 13. The stream is received and decoded by STB 13, which outputs 365 audiovisual data on its HDMI interface, and the audiovisual data is rendered by DTV 14. In the above described embodiment the protocol version to use for the audio/video stream receiver device to subscribe to a transmission by the audio/video stream router device of an audio/video stream, e.g., the IGMP version of the audio/video stream router device, is obtained by 'snooping' (listening, monitoring, receiving in a non-intrusive manner) the IGMP General Query Messages coming from the IP multicast router. For example, if the length of a received IGMP General Query message is 8 octets, the IGMP version used by the IP multicast router device is IGMPv1 or IGMPv2; in other words, the audio/video stream router device (the IP multicast router device) does not support SSM. If the length is twelve octets or more, it is an IGMPv3 General Query message; in other words, the IP multicast router device supports SSM. A protocol version to use for the audio/video stream receiver device to subscribe to a transmission by the audio/video stream router device of an audio/video stream, e.g., an Internet Group Management Protocol version of said received Internet Group Management Protocol General Query message, can thus be obtained from a length of a received Internet Group Management Protocol General Query message.

According to a different embodiment, the protocol version to use for the audio/video stream receiver device to subscribe to a transmission by the audio/video stream router device of an audio/video stream, e.g., the IGMP version of the IP multicast router device, can be obtained from reading out the previously mentioned Host Compatibility Mode (HCM) variable (parameter) of the interface of the IP multicast receiver device receiving the IGMP General Query messages from the IP multicast router. This variable (parameter) is refreshed upon receipt of IGMP General Query messages.

It can thus be observed that through the principles of the present disclosure no time is lost, no time is spent in waiting for the next transmission of the IGMP General Query message. Startup time of STB 13 is thus considerably reduced with the system 4 of FIG. 4, to a normal startup time required for booting STB 13, as the first connection to a multicast stream of STB 13 is not delayed due to an incompatibility issue between the router and the STB.

Figure 6:
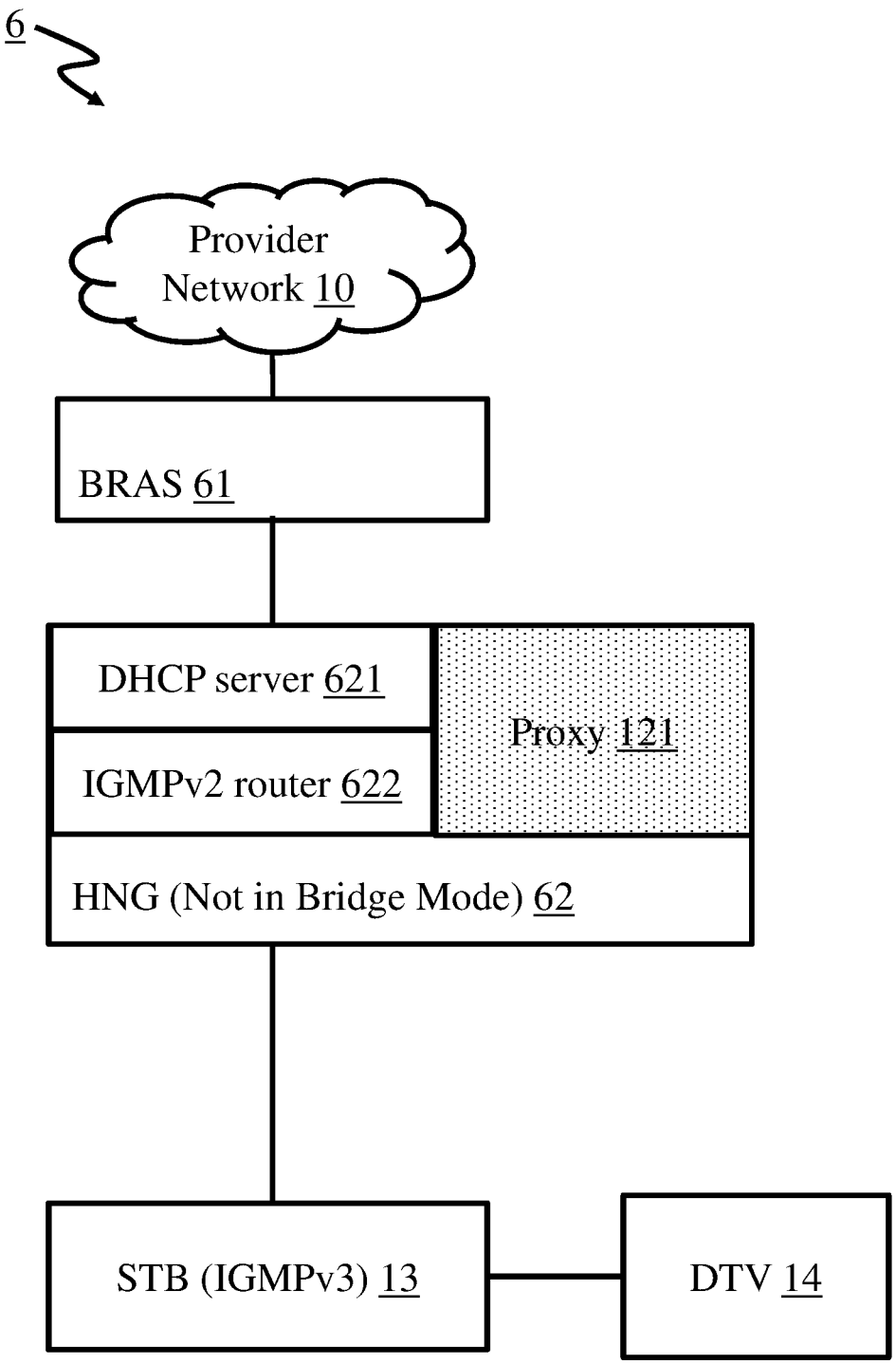
FIG. 6 is an embodiment of system 6 per the principles of the present disclosure.

FIG. 6 is a system 6 per the principles of the present disclosure. HNG 62 is different from HNG 12 in that HNG 62 is not functioning in OSI layer 2 bridge mode and includes a DHCP server 621 and an IGMPv2 IP multicast router 622. The principles of the present disclosure equally apply in such configuration. Therefore, proxy 121 in HNG 62 of FIG. 6 is no different than proxy 121 in HNG 12 of FIG. 4, a part from that DHCP and IGMP packets are not exchanged between BRAS 11 and STB 13 but between HNG 62 and STB 13. Still different embodiments than depicted in FIGS. 4 and 6 are possible and do not modify the present principles. For example, a BRAS may include an IGMP router while a HNG includes a DHCP server, or vice versa. Since the proxy is in the HNG that, as an intermediate device, has a central position, the proxy can snoop the data communication, e.g. DHCP and possibly IGMP packets according to the embodiment chosen, can receive from the audio/video stream router device a message (e.g., an IGMP General Query message), can obtain from this message a protocol version (e.g., IGMPv2) to use for the audio/video stream receiver device to subscribe to a transmission by the audio/video stream router device of an audio/video stream, and when the proxy receives a message indicative of the audio/video stream receiver device starting up (e.g., a DCHP Discover message), can intervene by transmitting a message indicative of the audio/video stream router device using a protocol version not supporting source-specific multicast (e.g. an IGMPv3 General Query message), to the audio/video stream receiver device (the IP multicast receiver device) per the principles of the present disclosure when required no matter where the DHCP server and IGMP router are placed.

According to an embodiment of the principles of the present disclosure, the LAN including more than the one STB device, the proxy/HNG, when receiving a message indicative of the audio/video receiver device starting up (a DHCP communication between a LAN device and a DHCP server), subordinates the discussed transmission of the message indicative of the audio/video stream router device using a protocol version not supporting source-specific multicast (e.g., an IGMPv2 General Query) to the LAN device to a verification (checking) whether the audio/video stream receiver device from which the message indicative of the audio/video receiver device starting up is received corresponds to a device for which the transmitting of the message indicative of said audio/video stream router device using a protocol version not supporting source-specific multicast is enabled. This allows the intermediate device (e.g. the proxy/HNG) to be configured to enable or disable the transmission (injection) of the message indicative of the audio/video stream router device using a protocol version not supporting source-specific multicast (e.g., the IGMPv2 General Query message) for some or all LAN devices. Such verification (checking) can for example be done based on the DHCP option 60 field in a received DHCP Discover message. Option 60 (Vendor Class Identifier (VCI)) in the DHCP Discover message is widely used to represent device type or user class of the DHCP client. It is a variable-length string of characters. Such configuration for enabling/disabling the transmission of the message indicative of the audio/video stream router device using a protocol version not supporting source-specific multicast may be done by a network administrator and may be stored in a memory of the intermediate device. The conditions for transmission by the intermediate device of the message indicative of said audio/video stream router device using a protocol version not supporting source-specific multicast to the LAN device then are that the protocol version to use for the audio/video stream receiver device to subscribe to a transmission by the audio/video stream router device of an audio/video stream is a version not supporting SSM AND that LAN device corresponds to a device of which the DHCP Discovery option 60 value is memorized in the intermediate device for which such transmission is allowed (enabled). In all other cases, the transmission is not done.

According to a different embodiment, the intermediate device's subordination of transmission of message indicative of the audio/video stream router device using a protocol version not supporting source-specific multicast to the LAN device to a verification whether the audio/video stream receiver device from which the message indicative of the audio/video receiver device starting up is received corresponds to a device for which the transmitting of the message indicative of the audio/video stream router device using a protocol version not supporting source-specific multicast is enabled is rather based on the Media Access Control (MAC) address, which, contrary to the IP address of a device or network interface of a device, does not change. The conditions for transmission of the message indicative of the audio/video stream router device using a protocol version not supporting source-specific multicast to the LAN device then are that the protocol version to use for the audio/video stream receiver device to subscribe to a transmission by the audio/video stream router device of an audio/video stream is a protocol version not supporting source-specific multicast AND the value of the MAC address of the LAN device corresponds to the MAC address of a LAN device which is memorized in the intermediate device for being that of a LAN device to which such transmission is allowed (enabled). Otherwise, the transmission is not done.

At least one advantage of the above mentioned embodiments of subordination to selectively enable transmission (injection) of transmission of message indicative of the audio/video stream router device using a protocol version not supporting source-specific multicast for specific LAN devices is that it limits the message traffic on the LAN and avoids creating unwanted side effects for devices that are not concerned.

According to an embodiment that can be combined with the previous embodiments, the transmission of a message indicative of the audio/video stream router device using a protocol version not supporting source-specific multicast for specific LAN devices is further subordinated to checking whether an acknowledge message (e.g., a DHCP ack following a DHCP Discover) has been received that is destined to the LAN device. At least one advantage of this embodiment is that it is thus ensured that the LAN device is ready to receive and consider the message indicative of the audio/video stream router device using a protocol version not supporting source-specific multicast when transmitted to it by the intermediate device, because the receipt of the DHCP ack indicates that the IP address of the LAN device is confirmed by the DHCP server. The conditions for transmission of the message indicative of the audio/video stream router device using a protocol version not supporting source-specific multicast by the intermediate device to the LAN device then are that the protocol version to use for the audio/video stream receiver device to subscribe to a transmission by the audio/video stream router device of an audio/video stream is a protocol version not supporting source-specific multicast AND that an acknowledge message (e.g., DHCP ack following a DHCP Discover) destined to the LAN device has been received (snooped) by the intermediate device. Otherwise, the transmission is not done.

Figure 7:
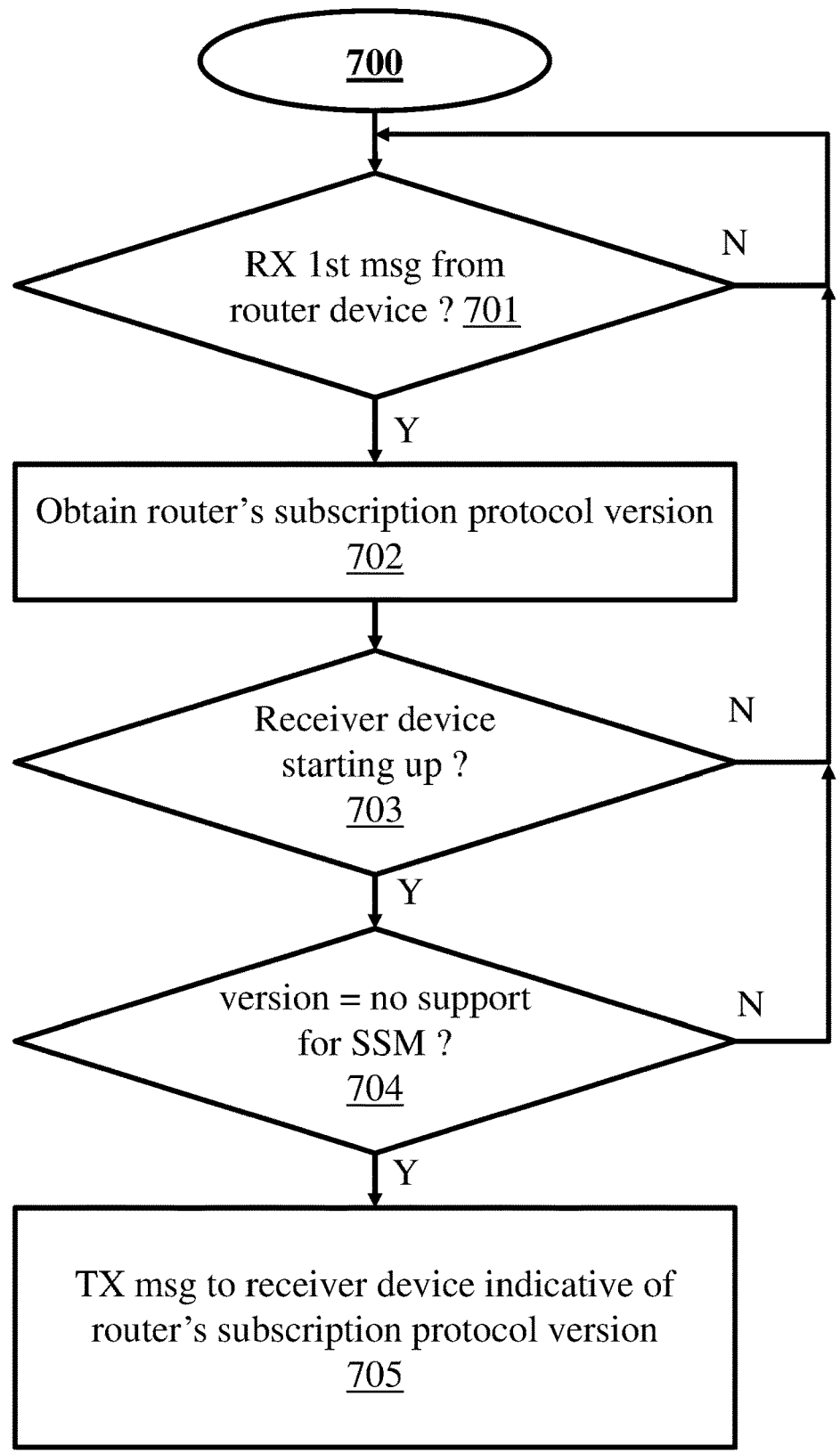
FIG. 7 is providing information to an audio/video stream receiver device per the present principles.

FIG. 7 is a flow chart of an embodiment of a method of providing information to an audio/video stream receiver device per the principles of the present disclosure. The method 700 is for example implemented by an intermediate device such as HNG 12 or 61 interconnecting an audio/video stream router device such as IGMP router 112 or 622 and an audio/video stream receiver device such as STB 13. The method includes receiving, from the audio/video stream router device, a first message (701—Yes) and obtaining 702 from the first message a protocol version to use for the audio/video stream receiver device to subscribe to a transmission by the audio/video stream router device of an audio/video stream. The method further includes receiving, from the audio/video receiver device, a second message indicative of the audio/video receiver device starting up (703—Yes) and if the protocol version is a protocol version not supporting source-specific multicast (704—Yes), transmitting 705, to the audio/video stream receiver device, a third message indicative of the audio/video stream router device using a protocol version not supporting source-specific multicast.

FIG. 8 is an embodiment of an intermediate device 8 with processor and memory for implementing the method per the principles of the present disclosure. Device 8 is for example HNG 12 of FIG. 4 or HNG 62 of FIG. 6. It includes a central processing unit or processor 800, a memory 801, a first network interface 802, a second network interface 803, interconnected via an internal communication bus 810. The first network interface 802 is for example for a WAN connection including to BRAS 11 of FIG. 4 or BRAS 61 of FIG. 6. The second network interface 803 is for example for LAN connection including to STB 13. The functions as depicted in flow chart 700 of FIG. 7 are performed in device 8. For example, the first message in step 701 is received by first network interface 802 and step 702 is performed by processor 800. For example, the second message is received by second network interface 803 and processor 800 performs step 704. Finally, the message in step 705 is transmitted by the second network interface 803.

It is to be appreciated that some elements in the drawings may not be used or be necessary in all embodiments. Some operations may be executed in parallel. Embodiments other than those illustrated and/or described are possible. For example, a device implementing the present principles may include a mix of hard- and software. Aspects of present embodiments may be used in other IGMP versions than IGMPv2/v3, such as IGMPv1/v2. Aspects of the present embodiments may be used in other communication protocols than IGMP, such as current or future IP multicast protocols, without diverting from the present principles. Aspects of the present embodiments may be used in other communication protocols than DHCP, such as other current or future protocols that enable to determine that a LAN device is starting up, without diverting from the present principles.

It is to be appreciated that aspects of the principles of the present disclosure can be embodied as a system, method or computer readable medium. Accordingly, aspects of the principles of the present disclosure can take the form of an entirely hardware embodiment, an entirely software embodiment (including firmware, resident software, micro-code and so forth), or an embodiment combining hardware and software aspects that can all generally be defined to herein as a "circuit", "module" or "system". Furthermore, aspects of the principles of the present disclosure can take the form of a computer readable storage medium. Any combination of one or more computer readable storage medium(s) can be utilized.

Thus, for example, it is to be appreciated that the diagrams presented herein represent conceptual views of illustrative system components and/or circuitry embodying the principles of the present disclosure. Similarly, it is to be appreciated that any flow charts, flow diagrams, state transition diagrams, pseudo code, and the like represent various processes which may be substantially represented in computer readable storage media and so executed by a computer or processor, whether such computer or processor is explicitly shown.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information there from. A computer readable storage medium can be, for example, but is not limited to, an electronic, magnetic, optical, electromagnetic, infrared, or semiconductor system, apparatus, or device, or any suitable combination of the foregoing. Some or all aspects of the storage medium may be remotely located (e.g., in the 'cloud'). It is to be appreciated that the following, while providing more specific examples of computer readable storage mediums to which the present principles can be applied, is merely an illustrative and not exhaustive listing, as is readily appreciated by one of ordinary skill in the art: a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing.

The invention claimed is:

1. A method of providing information to an audio/video stream receiver device, said method being implemented by an intermediate device interconnecting a router device and said audio/video stream receiver device, said method comprising:

receiving from said router device, a first message and obtaining from said first message a protocol version to use for said audio/video stream receiver device to subscribe to a transmission by said router device of an audio/video stream; and receiving, from said audio/video stream receiver device, a second message indicative of said audio/video stream receiver device starting up and if said protocol version is a protocol version not supporting source-specific multicast, transmitting to said audio/video stream receiver device, a third message indicative of said router device using said protocol version that does not support source-specific multicast.

2. The method according to claim 1, wherein said protocol is an Internet Group Management Protocol, said protocol version is an Internet Group Management Protocol, said audio/video stream is an Internet Protocol multicast audio/video stream and said first message and said third message are Internet Group Management Protocol General Query messages.

3. The method according to claim 1, wherein said second message is a Dynamic Host Configuration Protocol Discover message.

4. The method according to claim 2, further comprising obtaining said Internet Group Management Protocol version of said first message from a length of said first message.

5. The method according to claim 2, further comprising obtaining said Internet Group Management Protocol version of said received Internet Group Management Protocol General Query message from a Host Compatibility Mode variable of said router device.

6. The method according to claim 1, further comprising applying an additional condition to said transmitting of said third message to said audio/video stream receiver device of checking from said second message if said audio/video stream receiver device from which said second message is received corresponds to a device for which said transmitting of said third message is enabled.

7. The method according to claim 1, further comprising applying an additional condition to said transmitting of said third message to said audio/video stream receiver device of checking from said second message if a Media Access Control address of said audio/video stream receiver device corresponds to a device for which said transmitting of said third message is enabled.

8. The method according to claim 3, further comprising an additional condition to said transmitting of said third message to said audio/video stream receiver device of checking whether a Dynamic Host Configuration Protocol acknowledge message has been received that is destined to said audio/video stream receiver device.

9. A non-transitory computer-readable storage medium comprising program code instructions executable by a processor for implementing the method according to claim 1.

10. A computer program product which is stored on a non-transitory computer readable medium and comprises program code instructions executable by a processor for implementing the method according to claim 1.

11. A device for providing information to an audio/video stream receiver device, comprising at least one processor and a memory configured to:
receive, from a router device, a first message and obtain from said first message a protocol version to use for said audio/video stream receiver device to subscribe to a transmission by said router device of an audio/video stream;
receive, from said audio/video stream receiver device, a second message indicative of said audio/video stream receiver device starting up and if said protocol version is a protocol version not supporting source-specific multicast, transmit to said audio/video stream receiver device, a third message indicative of said router device using said protocol version that does not support source-specific multicast.

12. The device according to claim 11, wherein said protocol is an Internet Group Management Protocol, said protocol version is an Internet Group Management Protocol, said audio/video stream is an Internet Protocol multicast audio/video stream and said first message and said third message are Internet Group Management Protocol General Query messages.

13. The device according to claim 11, wherein said second message is a Dynamic Host Configuration Protocol Discover message.

14. The device according to claim 12, wherein said at least one processor and said memory are further configured to obtain said Internet Group Management Protocol version of said first message from a length of said first message.

15. The device according to claim 12, wherein said at least one processor and said memory are further configured to obtain said Internet Group Management Protocol version of said Internet Group Management Protocol General Query message from a Host Compatibility Mode variable of said router device.

16. The device according to claim 11, wherein said at least one processor and said memory are further configured to apply an additional condition to said transmitting of said third message to said audio/video stream receiver device of checking from said second message if said audio/video stream receiver device from which said second message is received corresponds to a device for which said transmitting of said third message is enabled.

17. The device according to claim 11, wherein said at least one processor and said memory are further configured to apply an additional condition to transmitting of said third message to said audio/video stream receiver device of checking from said second message if a Media Access Control address of said audio/video stream receiver device corresponds to a device for which said transmitting of said third message is enabled.

18. The device according to claim 13, wherein said at least one processor and said memory are further configured to apply an additional condition to said transmitting of said third message to said audio/video stream receiver device of checking whether a Dynamic Host Configuration Protocol acknowledge message has been received that is destined to said audio/video stream receiver device.

* * * * *

UNITED STATES PATENT AND TRADEMARK OFFICE
CERTIFICATE OF CORRECTION

PATENT NO.         : 11,218,523 B2  
APPLICATION NO.    : 16/616476  
DATED              : January 4, 2022  
INVENTOR(S)        : Zujian Zhuang and Jiancheng Liu Page 1 of 1

It is certified that error appears in the above-identified patent and that said Letters Patent is hereby corrected as shown below:

In the Claims

In Claim 4, at Column 12, Line 52, after the word "comprising", delete "obtaining said" and insert therefor --determining that said protocol version is an--.
In Claim 4, at Column 12, Line 52, after the word "Protocol", delete "version of said first message from" and insert therefor --based on--.

In Claim 5, at Column 12, Line 55, after the word "comprising", delete "obtaining said Internet Group Management Protocol version of said received" and insert therefor --determining that said first message and said third message are--.
In Claim 5, at Column 12, Line 57, after the word "Query", delete "message from" and insert therefor --messages based on--.

In Claim 11, at Column 13, Line 27, after the word "stream;", insert --and--.

In Claim 14, at Column 14, Line 8, after the words "configured to", delete "obtain said" and insert therefor --determine that said protocol version is an--.
In Claim 14, at Column 14, Line 9, after the word "Protocol", delete "version of said first message from" and insert therefor --based on--.

In Claim 15, at Column 14, Line 13, after the words "configured to", delete "obtain said Internet Group Management Protocol version of said" and insert therefor --determine that said first message and said third message are--.
In Claim 15, at Column 14, Line 14, after the word "Query", delete "message from" and insert therefor --messages based on--.

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*